(12) United States Patent
Wild

(10) Patent No.: US 6,776,084 B2
(45) Date of Patent: Aug. 17, 2004

(54) GRILL

(76) Inventor: Rudolf Wild, Kastenweg 12, 96148 Baunach (DE)

( * ) Notice: Subject to any disclaimer, the term of this patent is extended or adjusted under 35 U.S.C. 154(b) by 0 days.

(21) Appl. No.: 10/312,626

(22) PCT Filed: Jun. 28, 2001

(86) PCT No.: PCT/EP01/07368
§ 371 (c)(1),
(2), (4) Date: Dec. 27, 2002

(87) PCT Pub. No.: WO02/00075
PCT Pub. Date: Jan. 3, 2002

(65) Prior Publication Data
US 2004/0099151 A1 May 27, 2004

(30) Foreign Application Priority Data
Jun. 29, 2000 (DE) .......................... 200 11 385

(51) Int. Cl.[7] .............. A47J 9/00; A23L 1/00
(52) U.S. Cl. .............. 99/339; 99/340; 99/448; 99/450; 99/482; 126/9 R; 126/25 R
(58) Field of Search .............. 99/339, 340, 400, 99/401, 444–450, 481, 482, 483, 357; 126/29, 30, 25 R, 9 R, 9 A

(56) References Cited

U.S. PATENT DOCUMENTS

| | | | | |
|---|---|---|---|---|
| 2,842,043 A | * | 7/1958 | Reuland | ............. 99/482 |
| 3,261,344 A | | 7/1966 | Petrie | |
| 3,323,508 A | | 6/1967 | Holman | |
| 3,814,076 A | | 6/1974 | Zankowsky et al. | |
| 4,020,322 A | * | 4/1977 | Muse | ............. 219/392 |
| 4,467,709 A | * | 8/1984 | Anstedt | ............. 99/482 |
| 4,502,374 A | * | 3/1985 | Davis | ............. 99/349 |
| 4,724,753 A | | 2/1988 | Neyman et al. | |
| 5,287,844 A | | 2/1994 | Fieber | |
| 5,473,979 A | * | 12/1995 | Ruben | ............. 99/446 |
| 5,666,940 A | | 9/1997 | Kreiter | |
| 5,891,498 A | * | 4/1999 | Boehler | ............. 426/314 |
| 5,893,357 A | | 4/1999 | Royer et al. | |
| 5,988,045 A | * | 11/1999 | Housley | ............. 99/339 |
| 6,041,695 A | * | 3/2000 | Kuopus | ............. 99/428 |

FOREIGN PATENT DOCUMENTS

| | | |
|---|---|---|
| DE | 501633 | 7/1930 |
| DE | 2041614 | 2/1972 |
| DE | 3006876 | 9/1981 |
| DE | 29612848 | 10/1986 |
| DE | 29908006 | 7/1999 |

* cited by examiner

Primary Examiner—Timothy F. Simone
(74) Attorney, Agent, or Firm—Collard & Roe, P.C.

(57) ABSTRACT

The invention is a barbecue consisting of a base with an extension at its top side, a hollow-cylindrical center part attached to the base, one or several rests attached to this hollow-cylindrical center part and several coal pans inserted in the rests.

Furthermore, the barbecue has a hollow-cylindrical upper part attached to the center part. This upper part is equipped with cutouts in which one or several gridirons are inserted. The upper part can be rotated in relation to the center part. The extension of the base, the hollow-cylindrical center part and the hollow-cylindrical upper part form a columnar and vertical axis of the barbecue.

19 Claims, 4 Drawing Sheets

GRILL

CROSS REFERENCE TO RELATED APPLICATIONS

Applicant claims priority under 35 U.S.C. §119 of German Application No. 200 11 385.2 filed Jun. 29, 2000. Applicant also claims priority under 35 U.S.C. §365 of PCT/EP01/07368 filed Jun. 28, 2001. The international application under PCT article 21(2) was not published in English.

BACKGROUND OF THE INVENTION

1. Field of the Invention

The invention is a barbecue.

2. The Prior Art

U.S. Pat. No. 3,814,076 mentions a barbecue whose height is adjustable by means of specific devices. This barbecue is equipped with a vertical, square cross-sectional center part which, at its corners, has horizontal cutouts placed at an offset to one another in the vertical direction. A gridiron can be inserted in these cutouts.

DE-A1-20 41 614 mentions a charcoal barbecue which is equipped with a pan mounted on a support. This pan has holes for air circulation and can be detached, rotated and locked, if required, and it includes a container for fuel, which is open at the top and does not have any contact to the ground. This container is made of perforated sheet metal or a similar material, and it can be moved in the direction of the transverse axis of the barbecue. Furthermore, this barbecue has a cover which is not closed at the front and which slopes to the rear like a roof. This cover can be attached to the pan and is provided as a separable means for attaching a rotating spit or gridiron.

DE-U1-296 12 848 mentions a barbecue consisting of a frame and several accessories connected to this frame. These accessories include a gridiron, a pan for the coals and a plate which is attachable to the frame and where you can place food, for example. The frame consists of at least two two-segment stands with a connecting segment and a free segment each. The stands are non-rigidly connected to one another by means of the connecting segments and have uniform locking elements. The accessories are sector-shaped and are also equipped with locking elements which can be connected to the corresponding locking elements of the stands. The stands and the accessories form a basic barbecue module which can optionally be expanded by at least another stand of the same kind and at least another sector-shaped accessory. Based on the number of accessories, the barbecue device forms a full circle.

U.S. Pat. No. 3,323,508 mentions a barbecue equipped with a barbecuing surface which can easily be installed and removed.

Moreover, DE-C-501 633 mentions a barbecue equipped with a coal grate supported by a frame. The height of this grate is adjustable and attachable to the frame. A removable gridiron is mounted on the top of the frame.

Usual charcoal barbecues have a coal pan mounted on a base. At the top of the barbecue a gridiron is provided on which the food to be barbecued is placed.

Problems of usual barbecues are that after a certain time of barbecuing, coal has to be replenished to ensure that the heat required for barbecuing is provided. For the replenishing procedure it is essential to remove the gridiron from the barbecue and place it at an appropriate place, ensuring that the food is not exposed to smoke. As the gridiron is hot and as appropriate places for depositing it are usually not available, this depositing procedure causes problems. The gridiron cannot be placed on the barbecue again until the coals replenished are red-hot.

Further problems of usual barbecues are that food which is done but not required at the moment has to be deposited at a place where it neither burns nor cools down too quickly. Thus, the food is often placed at a side of the gridiron or it is often put in a dish made of aluminum. But in practice, the temperature is also very high there so that the food becomes dry, resulting in a loss of quality.

Furthermore, food of different kind is often barbecued simultaneously. But as food of different kind is not done at the same time, the problems mentioned above are intensified.

There is a number of barbecues which are equipped with a gridiron whose height is adjustable in relation to the coal pan. If required, the food can be moved towards or away from the red-hot coals.

SUMMARY OF THE INVENTION

This invention is based on the task of finding a way to avoid the disadvantages mentioned above.

This task is achieved by a barbecue as presented herein.

Its advantages include the following features: when the food is done, it has not to be moved piece by piece to a place where the temperature is lower but it can be removed from too much heat by simply rotating the gridiron in relation to the coals. If required, it is also possible to rotate the gridiron in relation to the coals so that the food is subjected to a higher temperature. Furthermore, the pans can be filled with coal whenever this is required, ensuring that the barbecuing process is not interrupted.

When coals have to be replenished, this can be done without interrupting the barbecuing process: one of the coal pans is removed from its rest, this coal pan is filled with coal, and then it is placed again on its rest. The barbecuing process does not need to be interrupted as the remaining coals in the other pans are still able to provide for the heat required for the barbecuing process.

To make a part of a gridiron available for depositing food which is done but must not become too dry, it is possible to leave one of the coal pans empty. Thus, the food which is done can be placed in the region vertically above this coal pan.

To account for the different ranges of temperature required for food of different kind, the available gridirons can be attached to the cylinder-shaped top part of the barbecue at different heights.

A barbecue according to this invention can be disassembled quickly and easily, and as a set of components it can be transported in a space-saving manner.

BRIEF DESCRIPTION OF THE DRAWINGS

Further advantageous properties of this invention result from the following example based on figures.

DETAILED DESCRIPTION OF PREFERRED EMBODIMENTS

Figure 1:
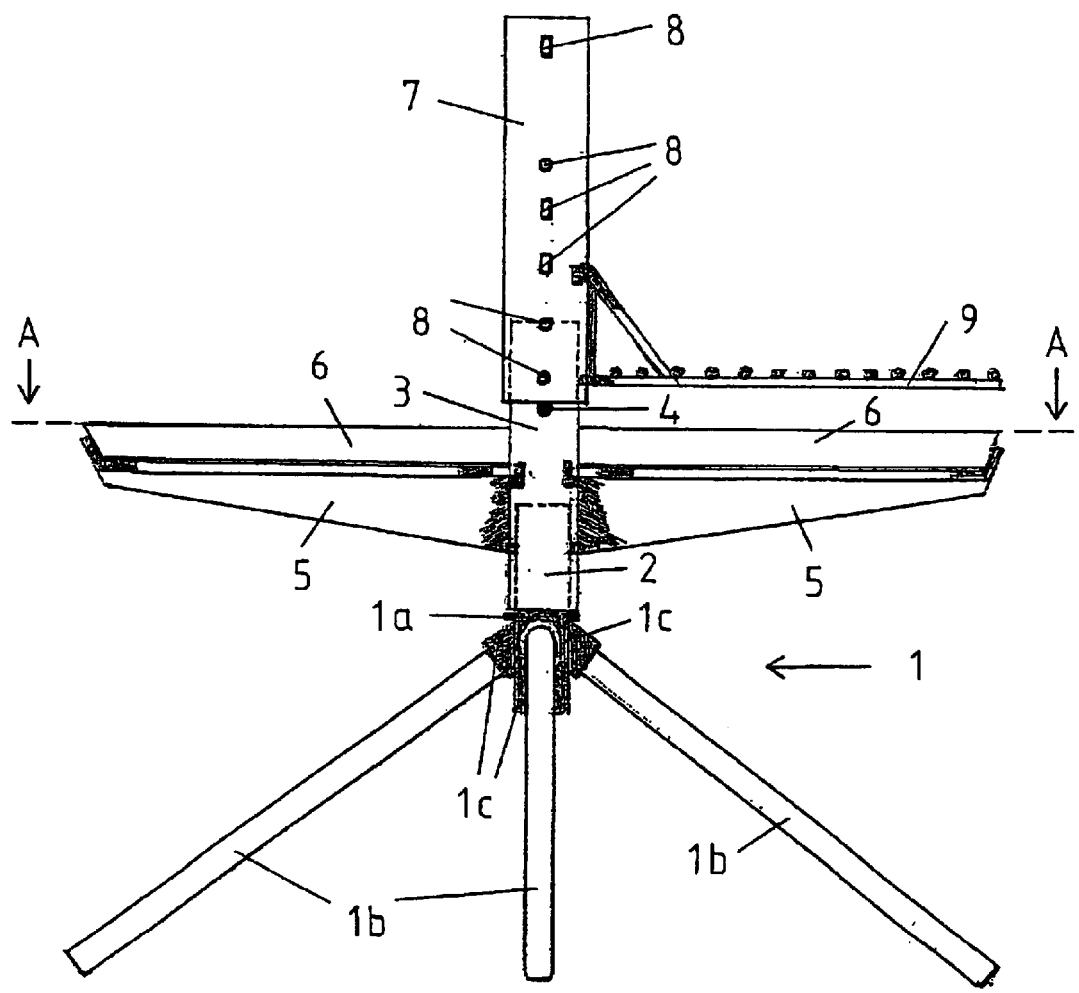
FIG. 1 is a side view of a barbecue according to this invention.

FIG. 1 shows a side view of a barbecue according to this invention. The barbecue displayed has a cross-shaped base 1 which is equipped with four tubular feet 1b, which are inserted in the connecting pieces 1c of the cross-shaped base. The connecting pieces and thus, the feet are placed at an offset of 90 degrees to one another. At the top side of the base, a tubular or hollow-cylindrical extension 2 is provided. Rolls or wheels can be attached to two or to all the four feet so that the barbecue can be moved during the barbecuing process; for example, when it starts to rain.

A hollow-cylindrical center part 3 is attached to the extension 2, with the diameter of the center part 3 being larger than the diameter of the extension 2. Thus, the center part 3 encloses the extension 2 at least partially. The bottom of the center part 3 rests on a stopper 1a of the base, preventing the center part from sliding down.

The center part 3 has cutouts in which rests 5 are inserted. Preferably a total of four rests 5 is provided. These four rests 5 are arranged next to one another on the circumference of the center part 3. A coal pan 6 is inserted in each of these rests 5. These coal pans can be filled with as much coal as required, and this refilling process can take place whenever this is required during the barbecuing process.

It is also possible to attach the coal pans 6 directly to the center part 3. This alternative, which is not displayed in the drawing, does not require rests 5.

Figure 2:
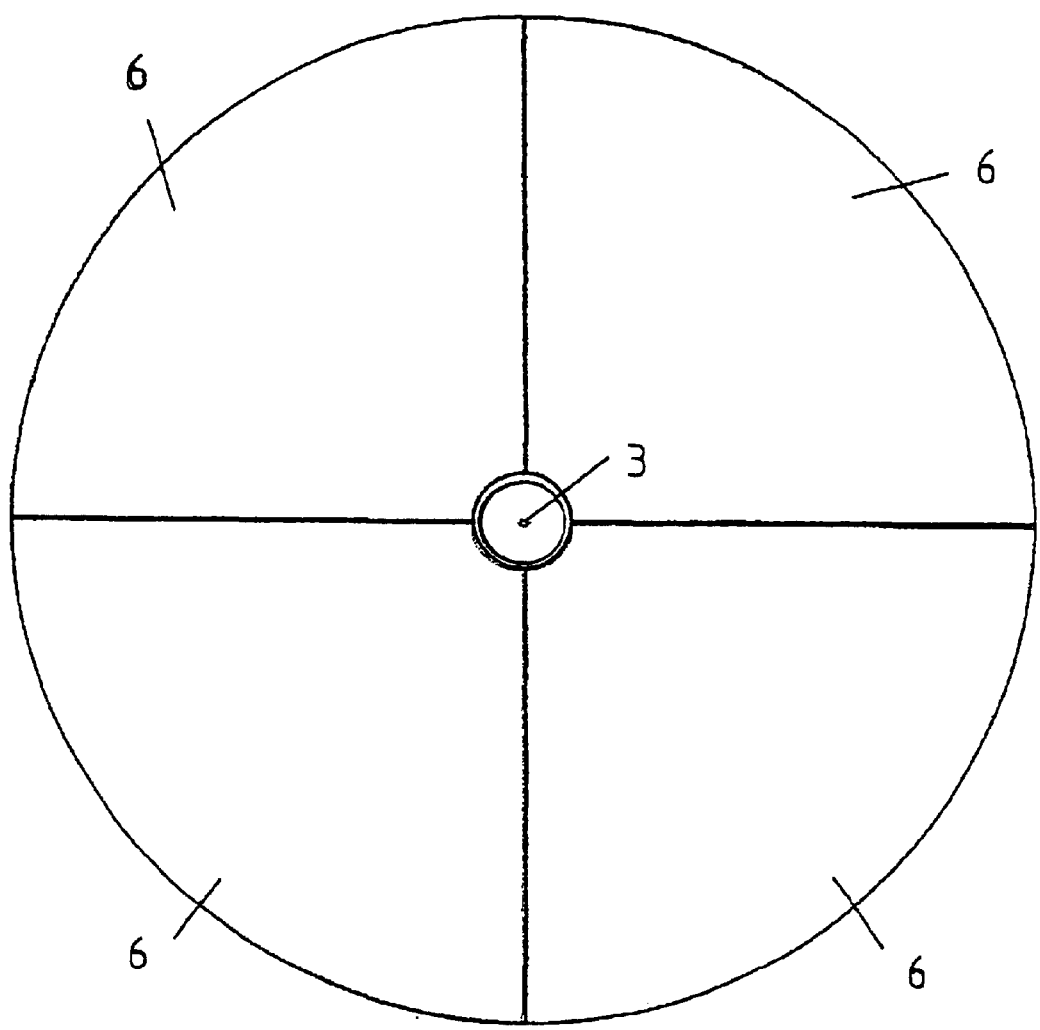
FIG. 2 is a longitudinal section of the barbecue along the line A—A displayed in FIG. 1.

According to FIG. 2, which shows a section of the barbecue along the line A—A displayed in FIG. 1, each coal pan has the shape of a quarter circle so that in plan view the coal pans form a full circle consisting of four coal pans.

The rests 5 including the coal pans and the center part 3, to which the rests 5 are attached, can be turned around the extension 2. Thus, during the barbecuing process, the coal pans can be moved in relation to the food located above the pans. This rotation is preferably done manually and serves to position the food so that it is subjected to the right temperature.

A hollow-cylindrical upper part 7 is attached to the hollow-cylindrical center part 3. This upper part 7 is closed at its top only, or it is equipped with a cover. The diameter of the hollow-cylindrical upper part 7 is larger than the diameter of the hollow-cylindrical center part 3 so that the upper part 7 encloses the center part 3 at least partially. The center part 3 has a stopper 4 on which the bottom of the upper part 7 rests.

The upper part 7 has a number of cutouts 8. In this example, the cutouts are arranged in four vertical rows placed at an offset of 90 degrees. Gridirons 9 equipped with hooks can be inserted in these cutouts 8. In this example, a total of four gridirons 9 is provided, and each gridiron has the shape of a quarter circle.

The four gridirons 9 can be arranged next to one another at the same height so that they form a circle in plan view. But during the barbecuing process, the height of each gridiron can be adjusted by inserting it in a higher or lower cutout of the upper part 7.

Thus various temperature ranges required for barbecuing food of different kind and of different size are achieved.

The upper part 7 can also be rotated in relation to the center part 3.

During the barbecuing process, the gridirons 9 including the upper part 7, to which the gridirons are attached, can manually be moved in relation to the coal pans. This is done by turning a gridiron 9 or a rest 5.

As described above, different ranges of temperature can be obtained by rotating the gridirons and thus, the food placed on them or by turning the coal pans. Furthermore, smoke which may arise can be avoided by simply rotating the gridirons and/or coal pans, and this movement does not affect the barbecuing process negatively.

Another advantage of the barbecue according to this invention is that if small amounts of food are to be barbecued, it is possible to use one coal pan and one gridiron only. Thus, the unused coal pans and gridirons are not soiled so that they do not have to be cleaned.

Moreover, another advantage is that the upper part 7 can be designed so that it is open at the top. Thus, a bar of an umbrella can be inserted in the upper part. This option of using an umbrella ensures that a barbecuing process can be continued even when it starts to rain.

Figure 3:
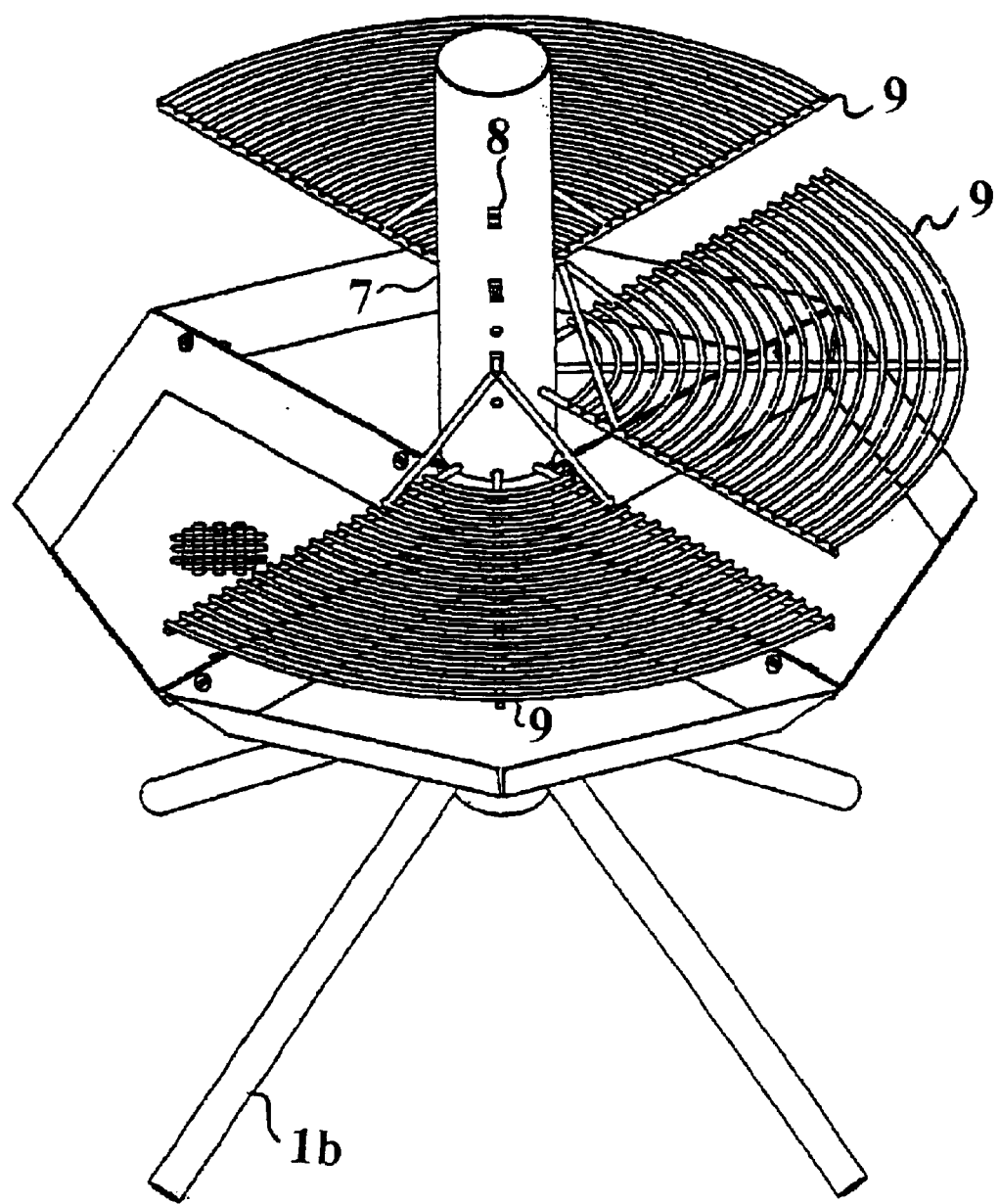
FIG. 3 is a perspective view of a barbecue according to this invention. This figure also includes gridirons attached to the barbecue at different heights.
Figure 4:
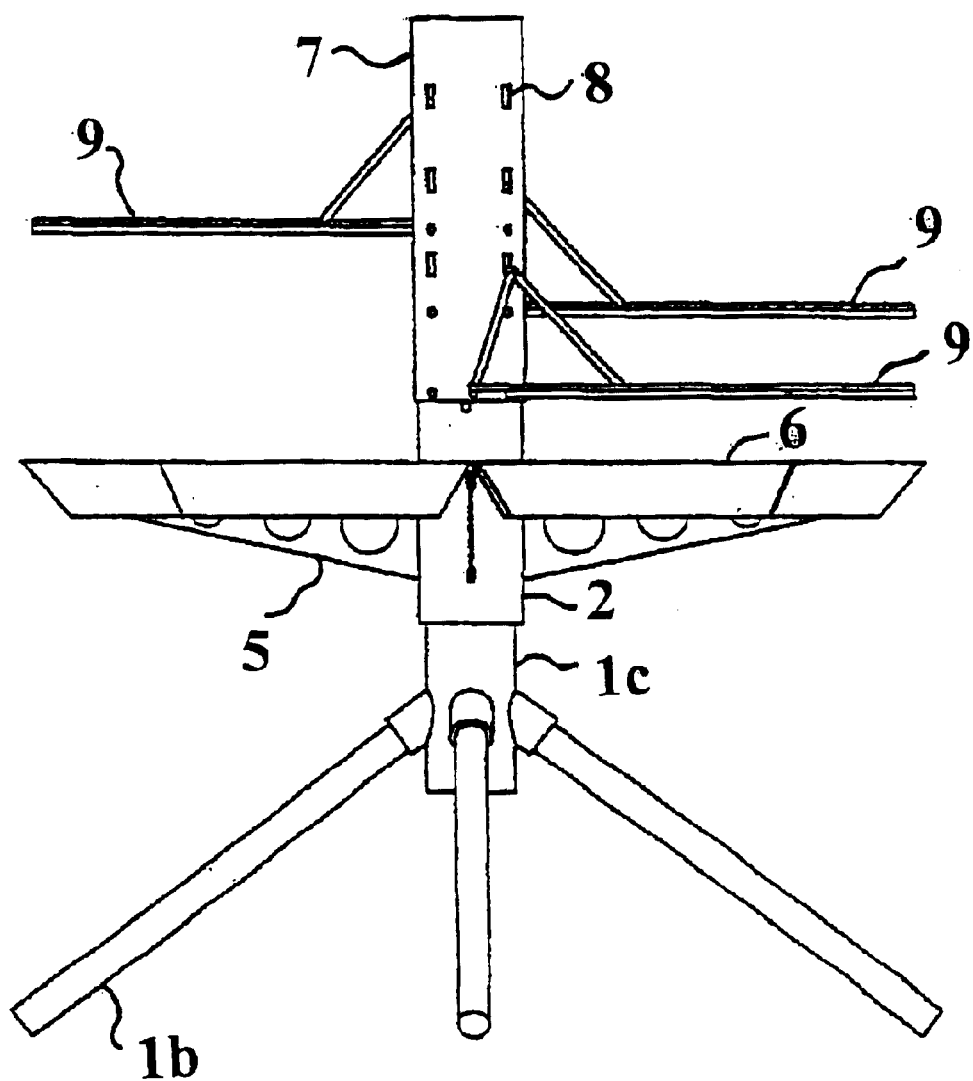
FIG. 4 is a side view of a barbecue according to this invention. This figure also includes gridirons attached to the barbecue at different heights.

FIG. 3 shows a perspective view of a barbecue according to this invention, with gridirons being attached to the barbecue at different heights. FIG. 4 is a side view of a barbecue according to this invention, with gridirons being attached to the barbecue at different heights.

What is claimed is:

1. A grill comprising:
   (a) a base provided with an extension at a top side of said base;
   (b) a hollow cylindrical middle part connected to said base;
   (c) a plurality of trays for charcoal connected to said middle part; and
   (d) a hollow cylindrical upper part having recesses for receiving one or more grill grids, said upper part being rotatable in relation to said middle part;
   wherein said extension, said middle part and said upper part form a column-shaped vertical axis of the grill.

2. The grill according to claim 1 wherein said base has a cross shape.

3. The grill according to claim 2 further comprising four connecting pieces provided in said base and offset from each other by 90 degrees and four foot parts, each foot part being inserted in a respective one of said connecting pieces.

4. The grill according to claim 1 wherein said middle part has a diameter larger than the diameter of the extension so that said middle part at least partially encloses said extension.

5. The grill according to claim 1 wherein said middle part is rotatable in relation to said base.

6. The grill according to claim 1 wherein said middle part has recesses into which supports are inserted.

7. The grill according to claim 6 wherein four supports are inserted in the recesses of said middle part.

8. The grill according to claim 7 wherein said plurality of trays comprises four trays having a quarter circular shape.

9. The grill according to claim 1 further comprising grill grids inserted in the recesses of said upper part.

10. The grill according to claim 1 wherein said upper part has a diameter larger than the diameter of the middle part so that said upper part at least partially encloses said middle part.

11. The grill according to claim 1 wherein said upper part is rotatable in relation to the middle part.

12. The grill according to claim 1 further comprising four grill grids having a quarter circular shape.

13. The grill according to claim 1 wherein said upper part has four vertical rows of recesses offset from each other by 90 degrees.

14. The grill according to claim 1 wherein said upper part is adapted to receive the grill grids at different heights.

15. The grill according to claim 1 wherein said base has a stopper up to which said middle part is attachable to said base.

16. The grill according to claim 1 wherein said middle part has a stopper up to which said upper part is attachable to said middle part.

17. The grill according to claim 1 wherein said grill is formed from a set of components comprising a plurality of foot parts, a part comprising a plurality of connecting pieces and an extension, a hollow cylindrical middle parts, a plurality of supports, a plurality of trays for charcoal, a hollow cylindrical upper part with a plurality of recesses and a plurality of grill grids.

18. The grill according to claim 1 further comprising one or more supports connected to the middle part for receipt of said trays.

19. The grill according to claim 1 further comprising an umbrella inserted in said upper part.

* * * * *